United States Patent [19]

Tarosky et al.

[11] 4,169,586

[45] Oct. 2, 1979

[54] AUTOMATIC DEVICE FOR STACKING CIRCULAR WORKPIECES

[75] Inventors: Jack Tarosky, Apollo, Pa.; Melvin R. Fahnestock, Parkersburg, W. Va.; Leonard J. Flowers, Oakmont, Pa.

[73] Assignee: Aluminum Company of America, Pittsburgh, Pa.

[21] Appl. No.: 859,581

[22] Filed: Dec. 12, 1977

[51] Int. Cl.² .................... B65H 29/34; B65H 29/50
[52] U.S. Cl. .......................................... 271/1; 414/80; 271/189; 271/192; 271/201
[58] Field of Search .............. 271/218, 192, 189, 201, 271/1; 214/6 DK, 6 G; 198/422

[56] References Cited

U.S. PATENT DOCUMENTS

| | | | |
|---|---|---|---|
| 1,305,501 | 6/1919 | Steele | 271/201 X |
| 3,124,059 | 3/1964 | Labombarde | 271/192 X |
| 3,205,794 | 9/1965 | Califano et al. | 271/192 X |
| 3,297,318 | 1/1967 | Knecht | 271/201 |
| 3,419,266 | 12/1968 | Martin | 271/201 X |
| 3,996,723 | 12/1976 | Greenwell | 214/6 DK X |

*Primary Examiner*—Bruce H. Stoner, Jr.
*Attorney, Agent, or Firm*—Glenn E. Klepac; Elroy Strickland

[57] ABSTRACT

Apparatus for stacking stackable workpieces in a plurality of side-by-side vertical columns. The apparatus includes a stacking head transversely movable on a frame, and a conveyor attached to the head for directing individual workpieces to the head. The head has downwardly extending arms that are peripherally spaced from each other a distance corresponding to the breadth of the workpieces for receiving the workpieces one upon the other, for accumulating the workpieces and for releasing the accumulated workpieces for vertical fall to a horizontal surface located below the arms and head.

6 Claims, 2 Drawing Figures

AUTOMATIC DEVICE FOR STACKING CIRCULAR WORKPIECES

BACKGROUND OF THE INVENTION

The present invention relates to an automatic stacking device.

Blanks and workpieces that are capable of being stacked one upon the other in an even, vertical column can be packaged and transported as a package or bundle of the workpieces. However, if the columns are not straight, packaging, such as effected by steel or other types of banding, becomes a problem, as the bandings will be or quickly become loose on the columns.

There are many stacking schemes and devices disclosed in the patent art (as cited and discussed hereinafter), but these devices do not provide capabilities of stacking stackable blanks in a plurality of closely spaced columns of the blanks in a continuous manner, in a manner that does not require interruption of the means (conveyors) conveying the blanks to the stacking location.

BRIEF SUMMARY OF THE INVENTION

The present invention involves a device capable of continuously stacking blanks or workpieces in a plurality of straight vertical columns and in a manner that requires no manual handling and/or straightening of the columns of workpieces. This is accomplished by a movable stacking head having downwardly extending arms peripherally spaced apart a distance corresponding to the breadth of the workpieces, the workpieces all having substantially the same breadth for a given, selected workpiece size. The stacking head is mounted on a frame in a manner that permits the head to move transversely of the frame so that a plurality of transversely located columns of workpieces can be stacked upon a horizontal surface, such as a wooden pallet, located beneath the head. To stack columns of the workpieces along the length of the pallet, in a continuous manner, thereby filling or covering the pallet surface with closely spaced, vertical stacks of workpieces, the pallet can be moved lengthwise beneath the frame and head. Continuous operation of the means feeding the head with workpieces is effected because the arms of the head are provided with inwardly extending tongues or pawls adapted to accumulate workpieces (within the arms) during the time the head is moving from the location of a finished column to an adjacent location for beginning another column. Thereafter, the tongues are moved to an out-of-the-way location on the arms to release the accumulated workpieces, which fall under force of gravity, to begin the next column.

As suggested earlier there are many stacking schemes and devices disclosed in the patent art. A detailed discussion of each one of these patents would unduly lengthen the present description. Instead, though these patents are not all generally similar to each other in detail, they are similarly lacking in the features disclosed in the stacking device of the present invention. Hence, the patents are listed and discussed here in a group. The patents are listed as follows:

| | |
|---|---|
| Smith | 1,141,277 |
| Steele | 1,305,501 |
| King | 2,420,828 |
| Wilske et al | 2,660,432 |
| Miller et al | 3,143,344 |
| Martin | 3,321,202 |
| Lucas | 3,549,144 |
| Lucas | 3,698,707 |
| Martin | 3,880,420 |
| Martin | 3,912,258 |
| Sheehan | 3,921,825 |
| Kroeze et al | 3,938,674 |

None of these patents show the above vertical arm arrangement of the invention in which stackable workpieces can be continuously fed to the arms, accumulated by the arms and then released by the arms to drop to a stacking surface without interrupting the mechanisms conveying the workpieces to the arms. In this manner a pallet (or other horizontal surface) can be traversed to effect a complete filling of the pallet or surface with individual, closely spaced columns of workpieces.

In addition to the above patents, U.S. Pat. No. 2,671,060 to Segsworth shows means for handling stacks of workpieces after they have been stacked, while U.S. Pat. No. 3,030,107 to Stidwill shows photocell means for controlling the rate at which stackable workpieces are stacked. These patents however again, do not show the vertical arm arrangement of the subject invention, and the versatility provided thereby.

BRIEF DESCRIPTION OF THE DRAWINGS

The objectives and advantages of the invention will be better understood from consideration of the following detailed description and the accompanying drawings, in which.

PREFERRED EMBODIMENTS OF THE INVENTION

Figure 1:
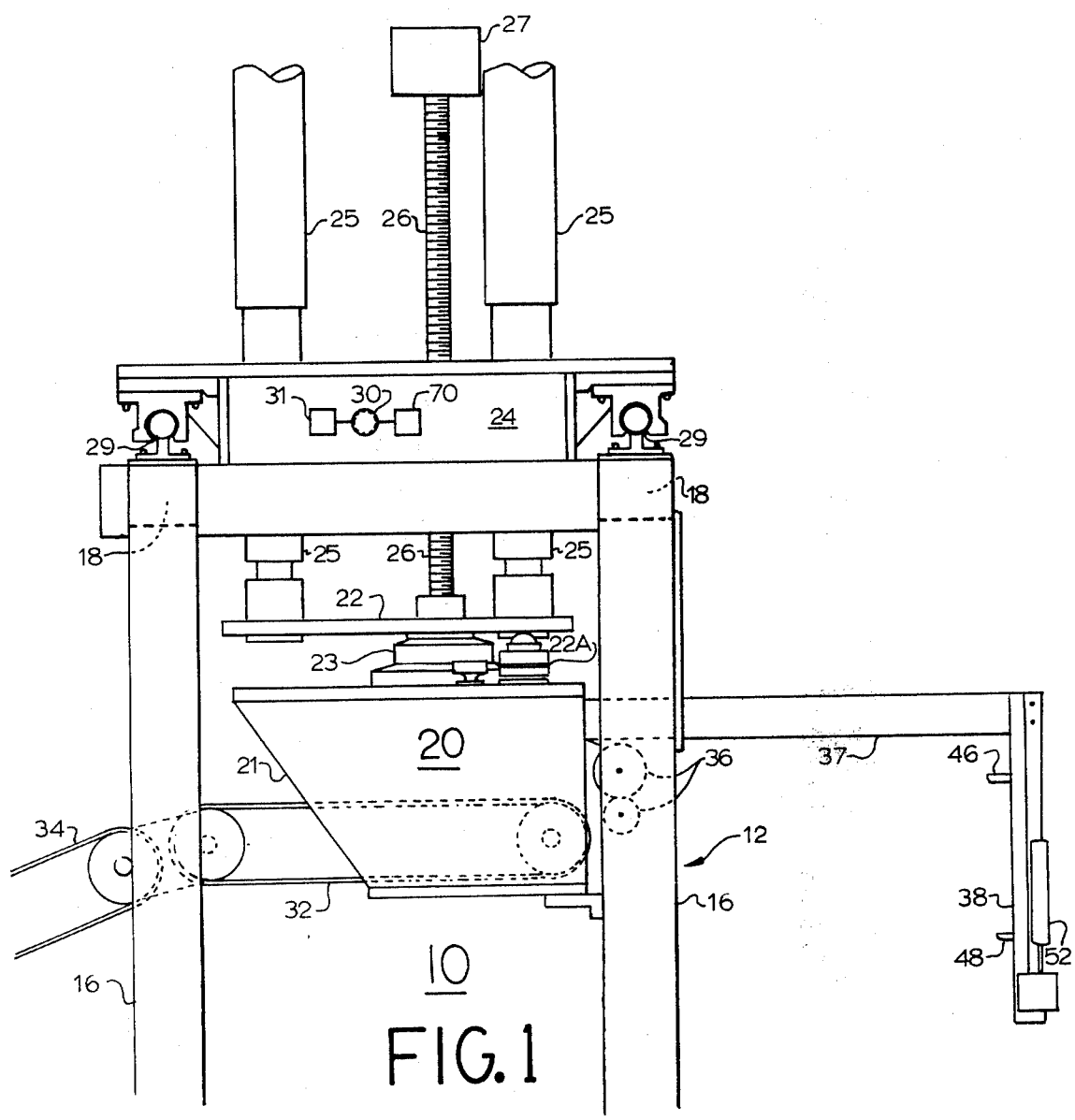
FIG. 1 is a side elevation view of the stacking device and arrangement of the invention.

Referring now to the drawings, FIG. 1 thereof shows in elevation a preferred embodiment of the automatic stacking device and arrangement (10) of the invention. The arrangement includes a rigid upstanding frame 12 only partially shown in FIG. 1. The frame, as shown, includes four vertically disposed, rigid post structures 16 (only two of which are visible in FIG. 1) and two overhead, horizontal beams 18, the ends of which are respectively, suitably joined to the upper ends of legs 16.

Within frame 12 is mounted a stacking head generally designated by numeral 20. Head 20 includes a housing 21 that is secured to a horizontal plate 22 by a swivel bearing unit 23, as shown in FIG. 1. Plate 22, in turn, is connected to an overhead carriage 24 by parallel shafts or bars 25, only two of which are visible in the figures, and is vertically translatable by a threaded shaft 26 (only partially shown in FIG. 1) and a drive motor 27, only diagrammatically shown in FIG. 1, the shafts 25 and 26 extending vertically through carriage 24. The lower ends of the shafts 25 and 26 are suitably secured to the horizontal plate, as shown in FIG. 1. Between the upper wall of housing 21 and plate 22, as shown in FIGS. 1 and 2, may be located ball bearing units 22A that stabilize housing 21 about swivel bearing 23 (FIG. 1) and relative to plate 22, the ball bearing units being fixed to the upper surface of 21.

Figure 2:
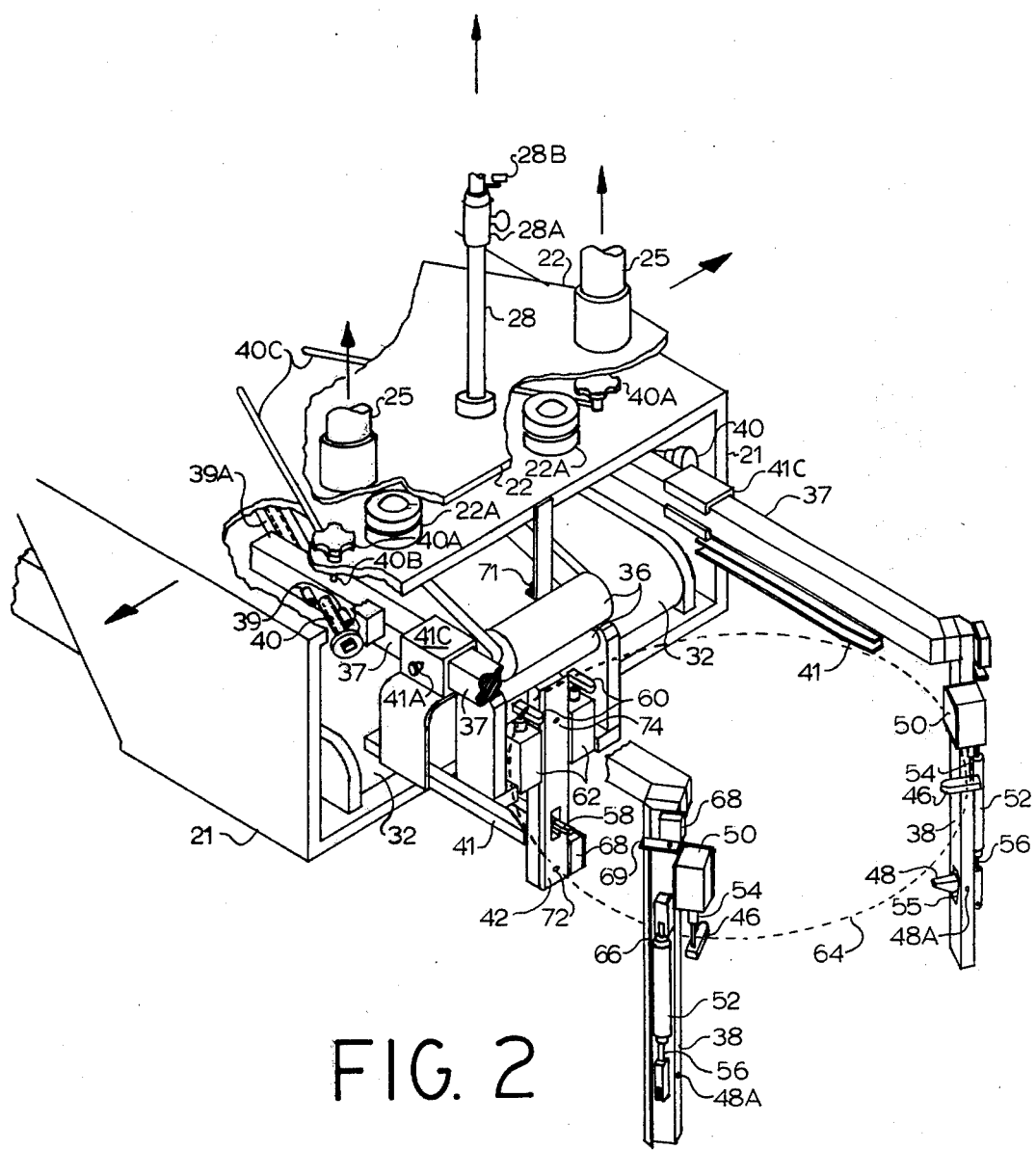
FIG. 2 is a perspective view of the stacking head of the arrangement of FIG. 1.

In FIG. 2, an additional vertical shaft 28 is shown secured to plate 22, and a collar 28A is shown adjustably secured to the vertical shaft. The purpose of collar 28A is to engage a limit switch 28B, located and suitably fixed above the collar, when the stacking head and shaft rise the distance between the collar and switch in the process of stacking workpieces, as explained in detail hereinafter. Collar 28A may be mounted on one of the rods 25 or on any suitable portion of plate 22, so long as it moves with head 20 to engage and disengage limit switch 28B.

Carriage 24 is mounted on frame 12 by two, parallel, horizontally extending bars 29, and horizontally translatable on a second threaded shaft 30, only one end of 29 and 30 being visible in FIG. 1. A second motor 31, shown only diagrammatically in FIG. 1, is suitably mechanically connected to shaft 30 to linearly translate the same. The bars 29 are secured on the upper surface of horizontal beams 18, as shown in FIG. 1.

Within the housing 21 of stacking head 20 is mounted a horizontal, endless conveyor belt generally designated 32. Mechanically operative with 32, and thus mechanically connected to head 20, is one end of a second, elongated conveying belt 34 (only partially shown in FIG. 1), the two belts (32 and 34) being located in lateral alignment with each other to permit transfer of workpieces from 34 to 32 when the upper surfaces of the belts are translated in the direction of housing 21. The other end of conveyor 34 is mounted in a manner that allows the end attached to the stacking head to move vertically and laterally with the head.

At the end of conveyor 32 opposite conveyor 34 is located a set of pinch or squeeze rolls 36. The pinch rolls and the two conveyors 32 and 34 are operated in a manner that will direct the workpieces along the conveyors and through the pinch rolls at the same linear speed. As shown in FIG. 2, the pinch rolls are substantially centered on the breadth of conveyor 32, and the bite of the rolls, as seen in FIG. 1, is in the plane of the upper surface of belt 32.

The stacking head 20 has two horizontal, elongated, structural arms 37, with integral, downwardly extending, vertical stacking arms 38, located outwardly from the pinch rolls 36. Each arm structure 37 is adjustably attached to housing 21 by two elongated rods 39 (shown broken away in FIG. 2) attached to the underside of the upper wall of 21 by a supporting structure 39A, and a shaft 40 threaded into and through arm 37 and into 39A. 39, 39A and shaft 40 are angularly disposed with respect to the arms 37 (which extend in a generally perpendicular manner from the plane of the front of housing 21) such that, with translation of each arm along its respective rod 39, via rotation of shaft 40, the stacking arms 38, are moved toward or away from each other while simultaneously being moved toward or away from housing 21 and a third, fixed stacking arm 42. In this manner the space between arms 38 and 42 can be changed to accommodate workpieces of different breadth or diameter.

Arms 37 can be secured in their adjusted position by a knob 40A bearing against the upper wall of 21, and shaft 40B that extends through the upper wall of 21. 40B is threaded into arm 37. The upper wall of housing 21 is provided with two elongated slots 40C located over 39 and 39A to permit movement of 40B therein when it is loosened (via knob 40A) in arm 37 to allow movement of 37 along shafts 39.

Adjustably mounted on each structural arm 37, and disposed in general parallel relation thereto, is a workpiece guide 41. As seen in FIG. 2, the guides are groove structures, mounted on arms 37 by C-shaped slides 41C and in a manner that faces the grooves of the guides toward each other and in line with the bite and pass line of squeeze rolls 36. The grooves are located above the horizontal plane of fingers 46 (presently to be described) located on arms 38. Adjustment of guides 41 is effected by loosening a thumb screw 41A threaded into the C-shaped slide 41C, and moving slide 41C along arm 37. When the guides are properly located (as explained hereinafter), the thumb screws are tightened against 37 to hold the guides in place.

In opposed relation to the two vertical arms 38, and suitably fixed to the housing of stacking head 20 and beneath a set of squeeze rolls 36, is a third, downwardly extending stacking arm 42, as best seen in FIG. 2. Arm 42 is centered on arms 38 to define an open, triangular area, with the arms located at the respective corners of the triangle.

Vertical arms 38 each have an upper finger 46 and a lower tongue 48 (only one of each is visible in the figures), both of which are respectively mechanically connected to and movable by actuating cylinders 50 and 52. As shown in FIG. 2, each finger 46 is connected to a cylinder 50 by shaft 54 which operates to rotate finger 46 in a horizontal plane about the axis of shaft 54. Tongues 48, however, are shown mounted and operable on stacking arms 38 to rotate in a vertical plane above pivot means 48A in each arm, and into and out of a slotted recess 55 provided in each arm 38, upon actuation of cylinders 52 and linear translation of linkage 56. The invention, however, is not limited to such a movement, i.e., tongues 48 (and 58 on arm 42) can be mounted and operated to rotate horizontally in the manner of fingers 46, or linearly in a straight line manner into and out of the area between arms 38 and 42, as is the case with 58. Similarly, fingers 46 (and 60 on arm 42) may be mounted and operated in a linear manner.

Tongue 58, corresponding to the tongues 48 on arms 38, is provided on and located adjacent the lower end of arm 42, the actuating cylinder for 58 being partially visible behind arm 42 in FIG. 2. The upper surfaces of tongues 48 and 58 are located in the same horizontal plane to receive and accumulate stackable blanks in the manner explained hereinafter.

On and adjacent the upper end of arm 42 are located two additional fingers 60, fingers 60 being located in the same horizontal plane as fingers 46 (of arms 38), and operable in the manner of 46 by actuating cylinders 62. In FIG. 2, a workpiece blank 64, of a plurality of such workpieces (not shown) to be stacked, is shown in phantom outline and resting on fingers 46 and 60, the fingers extending inwardly toward the center of the space defined by arms 38 and 42.

Each arm 38 has mounted thereon an elongated, slidable extension 66 (FIG. 2), and a limit switch 68 operable by vertical movement of slidable extension 66 and a tab 69 located on the upper end of 66. Only one such extension is visible in FIG. 2. The lower end of 66 extends below the lower extent of arm 38 a distance sufficient to operate switch 68 when head 20 is lowered toward the surface (not shown), upon which the stackable workpieces are to be stacked, and extension 66 engages such surface.

Beneath the stacking head 20 can be located an endless belt and a roller conveyor for moving pallets through the space between the legs or posts 16 of frame 12. These means are not shown, as they are not a necessary part of the stacking head and arrangement 10 of the subject invention.

Operation of the arrangement 10, as thus far described, is as follows. Initially, the end (not shown) of conveyor 34 remote from stacking head 20 is located adjacent a press or other means (not shown) that produces the workpieces or blanks to be stacked.

With the remote end of conveyor 34 appropriately situated, adjustment of collar 28A on shaft 28 is made to establish the height at which each column of the workpieces will be stacked. Increments of this height can be suitably indicated on shaft 28. If pallets are used for receiving the columns, each pallet is manually or automatically located beneath stacking head 20 in a manner that permits the stacking head to be initially located over one corner of the pallet. Carriage 24 is moved along horizontal bars 29 by operation of threaded shaft 30, driven by its motor 31, as mentioned earlier, to locate the stacking head over one corner of the pallet. The motor can be energized and de-energized to locate the head of the proper location by order of operating personnel working from a control console or, automatically, by commercially available pulse generators that are preset from a programmable controller (not shown) to signal energization and de-energization of the motor. Such a generator is indicated diagrammatically in FIG. 1 by numeral 70, the generator being mechanically connected to shaft 30 and capable of producing a pulse of energy for each predetermined increment of horizontal distance travelled by carriage 24 and the stacking head. The Allen Bradley Company makes a programmable controller, known as the PLC Controller, that is suitable for the present invention. A suitable pulse generator is made by ECCI Inc. of Mundelein, Illinois 60060.

The end of the conveyor 34 attached to the stacking head moves laterally with the head. The horizontal bars 29 and shaft 30 are straight such that lateral movement of the end of conveyor 34 attached to the stacking head 20 requires that the other end of 34 be capable of pivoting and moving slightly forward and backward, as head 20 and carriage 24 move laterally. This also requires that housing 21 rotate slightly about bearing 23 as carriage 24 and plate 22 move laterally along the straight traverse of bars 29 and 30.

The head 20 and conveyor 34 are now lowered toward the pallet (or other stacking surface) by operation of vertical shaft 26 (being driven by its drive motor 27) until slidable extensions 66 of arms 38 or an extension (not visible in the figures) on switch 68 of 42 engage the pallet (or other surface) and limit switches 68 are actuated by rise of 66 and 69 to stop further downward travel of the head by stopping operation of the vertical drive motor. Motor 27 may be energized by a signal from the above-mentioned programmable controller when the controller receives a signal from the pulse generator 70 that the head has stopped over the proper location.

The lower ends of arms 38 and 42 of the head now engage or are in close proximity to the pallet or other stacking surface.

It might be noted here that drive motors 27 and 31 may be pneumatically or electrically operated by appropriate sources of energy and controlled by known means, such as the above-mentioned controller and pulse generator 70. Similarly, the actuating cylinders 50, 52 and 60 of the fingers and tongues of arms 38 and 42 may be air or hydraulically operated or they may be electrical solenoids electrically operated. In addition, the actual connections of the electrical and/or pneumatic components employed in the invention can be effected in a variety of ways, such connections forming no part of the invention.

The actuation of limit switches 68 also functions to energize cylinders 52 to rotate tongues 48 downwardly and into recesses 55 of arms 38. Tongue 58 on arm 42 is retracted into its arm 42 at the same time by its cylinder which is energized when its switch 68 is actuated by extension means not visible in FIG. 2. The tongues are now in an out-of-the-way position. The fingers 46 and 60, however, are presently maintained in an inwardly directed position, as shown in FIG. 2. Three switches 68 are employed to insure that at least one of the switches is operated to stop downward movement of head 20 when the operating extension of the switch engages a fixed object or surface beneath it. In this manner, arms 38 and 42 are protected from being damaged should only one of the arms engage an object within the path of the downward travel of the head. Otherwise motor 27 would continue to drive such arm against such an object.

The arms 37 in housing 21 are manually adjusted (via adjusting rod 40) with respect to fixed arm 42, to provide a triangular space between the three arms 38 and 42 corresponding to the breadth or diameter of the workpieces or blanks to be stacked. In the present case, the arms are adjusted to the diameter of disc 64 shown in phantom in FIG. 2. Similarly, guides 41 (on each arm 37) are adjusted to support the discs in the grooves of 41 when they travel from the pinch rolls 36 to fingers 46 of arms 38. When each disc reaches a position over 46, it is clear of guides 41.

Conveyor 34 (FIG. 1) is operated to individually and sequentially transport each disc (64) from its place of origin (not shown) to conveyor 32 within housing 21, the discs being individually and sequentially conveyed through housing 21 by 32 and into the bite of squeeze rolls 36. As indicated earlier, the conveyors 32 and 34 and rolls 36 are operated together providing a consistent linear speed of travel for the workpieces (discs 64) to be stacked. Rolls 36 function to take and direct each disc into the space between vertical arms 38 and 42 in a horizontal plane. In this process the discs are directed through the grooves of guides 41 to the upper fingers 46 and 60 of vertical arms 38 and 42, the guides assisting in the process of maintaining horizontal orientation of the discs for fall to and deposition on fingers 46 and 60. The ends of the guides can be bevelled, as shown in FIG. 2, to insure that the discs (64) will be clear of the guides when the discs fall to the fingers of arms 38 and 42.

The upper fingers 46 and 60 can be operated to hold and accumulate a predetermined number of the discs (64) before cylinders 50 and 62 are actuated simultaneously to release the discs for downward fall to the pallet or other stacking surface, the lower tongues 48 and 58 having been rotated out-of-the-way by their actuating cylinders, as discussed earlier. The discs (64) are initially accumulated on fingers 46 and 60, in the embodiment of FIG. 2, because it has been found that a group of such discs generally fall more evenly and consistently than a single, individual disc. The number of discs (if any) to be accumulated, at this stage of the process, however, depends upon the weight, thickness and breadth of the discs.

If the workpieces (discs 64) are to be accumulated on fingers 46 and 60, the number of such workpieces in FIG. 2 for each accumulation is counted by a photocell means 71 (only diagrammatically shown in FIG. 2) located behind rolls 36 and a suitable counter or counting device (not shown) that is preset to the number of discs desired to be accumulated. As each disc passes under the photocell, and thereby momentarily reflects or interrupts light to the photocell, an electrical pulse is directed to the counter. After the counter counts the preset number of such pulses, the counter produces a signal that is effective to actuate cylinders 50 and 62 to rotate fingers 46 and 60 out-of-the-way of the accumulated discs; the discs then fall, as a unit, to the pallet or other stacking surface located beneath the discs and arms. These discs are held within the confine of arms 38 and 42, the stacking head still being in a lowered position, with arms 38 and 42 engaging or being in close proximity to the pallet or other surface. In this manner, a straight, even column of the discs is begun.

The photocell and electrical counting arrangement just described is a well-known counting technique and is given by way of example only. Other means may be used to count the workpieces directed to the stacking arms, if initial accumulation of workpieces is found to be desirable. If the mass and/or size of the workpieces or blanks to be stacked is such that each (single) workpiece falls properly by itself, then counting here is not necessary.

This process is repeated until the groups of accumulated discs being released and stacked within the confines of the arms 38 and 42 and on the pallet or other surface reach the level (height) of a second, lower photocell unit 72. Light energy is then reflected to or blocked from the photocell (depending upon the type of photocell unit employed) by the presence of the stack such that the photocell signals vertical drive motor 27 for stacking head 20 to raise the head to a position that places the lower ends of arms 38 and 42 adjacent the current height (top) of the stack. This removes the reflecting surfaces of the side of the column of discs (64) from photocell unit 72, which then operates to signal the vertical drive motor to stop the raising of head 20. During this time the discs continue to be received by arms 38 and 42 and their fingers 46 and 60, counted by 71 if counted, held for a predetermined count, and then released to the top of the current stack. When the lower photocell is again obscured by the growth of the column of discs, the head is again raised by 27. Arms 38 and 42 continue to confine the discs as they fall, and to maintain the discs in vertical alignment to provide a straight, even column or stack of discs.

The final height of each stack of discs is chosen by the location of collar 28A on vertical shaft 28. When the stacking head 20 reaches the chosen height, the collar engages and actuates limit switch 28B, which functions to stop the motor raising the head. The actuation of 28B also causes operation of the horizontal drive motor 31, and hence operation of shaft 30 (FIG. 1), to move carriage 22 (FIG. 1) and stacking head 20, laterally a distance corresponding to the width or diameter of the discs. A suitable spacing between the stack of discs to accommodate the stacking arms 38 and 42 may be included in this distance, though the arms can be located to extend in the empty areas created by adjacent stacks of circular blanks. The lateral distance travelled by the carriage and head, and any space provided between the stacks can again be measured by the pulse generator 70 (FIG. 1) driven by shaft 30, each pulse of the device representing a finite distance of travel of carriage 22 along shaft 30. After a predetermined number of pulses (representing the desired distance), the generator operates to stop the horizontal drive motor, and to start the vertical motor to lower stacking head 20 to the pallet or other surface in the manner described earlier.

During the period of time between the completion of one stack or column of discs and the beginning of the next column, upper fingers 46 and 60 continue to operate as before (catching and releasing discs), tongues 48 are rotated from recesses 55, and tongue 58 is thrust outwardly from 42, into inwardly extending positions on stacking arms 38 and 42, as shown in FIG. 2, by their respective actuating cylinders 52 and 62 to accumulate the discs. The tongue actuating cylinders are energized by switch 28B when the stacking head reaches its final height upon completion of each stack and collar 28A engages switch 28B. (28B also functions to stop the motor raising the stacking head, as discussed above.) The tongues now receive and accumulate the discs (64), as the discs are being continuously fed to the stacking arms by conveyors 32 and 34 and by pinch rolls 36.

When the stacking head is lowered again to the pallet to begin the next column of discs, limit switches 68 are again activated by movable arm portions 66 and tabs 69 to stop downward movement of the stacking head and to move tongues 48 and 58 again into arms 38 and 42. This releases the discs accumulated to the pallet during the time of movement to the next stack location. The formation of the next stack of discs is now begun, the operation hereafter being the same as that described above in connection with forming the first column.

When a first row of the columns of workpieces is completed across the pallet or other surface, carriage 24 and stacking head 20 have traversed frame 12, and are now at an extreme lateral position over the pallet or other surface opposite from the location at which they started. The pulse generator 70 discussed above in connection with the horizontal drive shaft 30 can now be used to monitor this distance and to signal for movement of a pallet conveyor, for example, to move the pallet forward a distance corresponding to the diameter of the discs and a suitable space between the column of discs. Another pulse generating device (not shown) can be employed to measure this distance if it is, for example, connected to receive pulses from a motor (not shown) moving the pallet conveyor, the generator signaling the motor to stop when the proper distance is counted. Stacking head 20 is now lowered again to the pallet, on instructions from an operator or from the above controller when the controller receives a signal from the pallet generator that the pallet conveyor is stopped. The above sequence of operations are begun again for stacking the discs in the process of beginning another row of stacks or columns.

When the carriage and stacking head complete another row of columns of discs across the pallet, the pulse generating device 70 associated with the shaft 30 again operates to signal for movement of the pallet conveyor to again move the pallet forward the proper distance. When the pallet is filled, it can be automatically moved forward and out-of-the-way of the stacking head, by the motor of the pallet conveyor, the automation being effected by the pulse generator associated with the conveyor motor. However, the pallet motor can be energized by operating personnel working from a control console to move the full pallet forward, or it can be manually moved forward so that another pallet can be moved into place beneath head 20. The above sequence of stacking is not begun anew either automatically or by order of operating personnel. During the pallet change, lower tongues 48 and 58 on arms 38 and 42 are again positioned to accumulate the discs (64) being fed to the stacking head when limit switch 28B is actuated by collar 28A, causing the operation of the actuating cylinders of 48 and 58.

An additional photocell unit 74 is diagrammatically shown in arm 42 of the stacking device as a means to prevent overaccumulation of workpieces. If, for some reason, the workpieces accumulated on lower tongues 48 and 58 are not released after the translation of the head 20 to the location for starting the next column, such that the workpieces reach the height of 74, 74 then functions to interrupt power to the circuitry of the stacking device, thereby stopping operation, so that the problem can be located and corrected.

While the invention has been described in terms of preferred embodiments, the claims appended hereto are intended to encompass all embodiments, which fall within the spirit of the invention.

What is claimed is:

1. A device for receiving circular workpieces from a transversely movable conveyor and for stacking said workpieces upon a surface located beneath the device in a plurality of generally vertical, side-by-side columns without interrupting transverse movement by the conveyor, comprising:
   (a) receiving means for initially receiving workpieces from said conveyor, said receiving means including a guide for directing transfer of workpieces from said conveyor to a plurality of vertical arms in the device; and
   (b) a plurality of vertical arms spaced laterally of one another by a distance generally corresponding to the breadth of the workpieces, each of said arms including:
      (1) a finger selectively movable between a first inwardly directed position wherein said finger temporarily supports workpieces, and a second out-of-the-way position wherein workpieces temporarily supported by said finger are dropped downwardly along said arms;
      (2) means for selectively moving said finger from its first position to its second position;
      (3) a tongue spaced downwardly of said finger, said tongue being selectively movable between a first, inwardly directed position wherein said tongue accumulates workpieces between said arms, and a second out-of-the-way position wherein workpieces accumulated between said arms fall downwardly together guided by the arms to form a neat stack on a surface located beneath the device; and
      (4) means for selectively moving said tongue from its first position to its second position.

2. The device of claim 1 further comprising means to sense the occurrence of each workpiece entering between the arms from the receiving means.

3. The device of claim 1 further comprising means for raising the arms, and wherein one of the arms includes means to sense a predetermined height of a column of workpieces supported by the arms and to order the raising of the arms when the column of workpieces reaches the predetermined height.

4. The device of claim 1 further comprising two vertically separated pinch rolls defining a bite centered therebetween, said bite being in the same horizontal plane as said guide.

5. The device of claim 1 wherein said arms comprise three arms spaced laterally from one another and defining an open, triangular area for stacking the workpieces.

6. A method for continuously stacking circular workpieces, comprising the steps of:
   (a) conveying circular workpieces on a conveyor transversely to reach a stacking device;
   (b) transferring workpieces from the conveyor to a stacking device;
   (c) guiding said workpieces into a triangular space defined by three vertical arms of the stacking device;
   (d) supporting said workpieces on three fingers, each of said three fingers being attached to one of said three vertical arms and extending inwardly thereof in a first, generally horizontal position;
   (e) counting the total number of workpieces supported by said arms until a predetermined number of workpieces is accumulated;
   (f) moving each of said three fingers into a second out-of-the-way position to drop a predetermined number of workpieces into a first stack on a surface located beneath the device;
   (g) raising the three arms of the device and moving the three arms transversely to another position adjacent the first stack;
   (h) simultaneously, while said three arms are being raised, moving three tongues respectively supported by each of said three arms and spaced downwardly of said fingers, inwardly from a second out-of-the-way position to a first generally horizontal position, thereby to accumulate workpieces on said tongues;
   (i) moving each of said three tongues from its second position to its first position; and
   (j) repeating steps (a) through (f) thereby to form a second stack of circular workpieces adjacent the first stack.

* * * * *